US008948727B2

(12) United States Patent
Tang et al.

(10) Patent No.: US 8,948,727 B2
(45) Date of Patent: Feb. 3, 2015

(54) PROVIDING WIRELESS MOBILE DEVICE INFORMATION TO A CALL CENTER

(75) Inventors: Jin Tang, Madison Heights, MI (US); Ki Hak Yi, Windsor (CA); Andrew J. MacDonald, Grosse Pointe Park, MI (US); Sethu K. Madhavan, Canton, MI (US)

(73) Assignee: General Motors LLC, Detroit, MI (US)

( * ) Notice: Subject to any disclaimer, the term of this patent is extended or adjusted under 35 U.S.C. 154(b) by 563 days.

(21) Appl. No.: 12/789,546

(22) Filed: May 28, 2010

(65) Prior Publication Data

US 2011/0294466 A1 Dec. 1, 2011

(51) Int. Cl.
*H04M 3/16* (2006.01)
*H04W 12/08* (2009.01)
*H04W 4/04* (2009.01)
*H04W 4/00* (2009.01)

(52) U.S. Cl.
CPC .............. *H04W 12/08* (2013.01); *H04W 4/046* (2013.01); *H04W 4/008* (2013.01)
USPC ...................... 455/411; 455/412.2; 455/456.6; 455/456.1; 455/414.2; 455/456.3

(58) Field of Classification Search
USPC ................. 455/426.1, 41.2, 411, 12.2, 456.6, 455/456.1, 414.2, 456.3, 456.4, 456.2
See application file for complete search history.

(56) References Cited

U.S. PATENT DOCUMENTS

| 7,894,795 B1 * | 2/2011 | Dunne et al. ................... 455/406 |
| 2006/0047415 A1 * | 3/2006 | Groskreutz et al. ........... 701/201 |
| 2006/0135170 A1 * | 6/2006 | Patenaude ...................... 455/450 |
| 2009/0197593 A1 * | 8/2009 | Farrell et al. ................ 455/426.1 |
| 2010/0256861 A1 * | 10/2010 | Hodges ........................... 701/33 |
| 2011/0224870 A1 * | 9/2011 | Tan ................................ 701/36 |
| 2011/0281562 A1 * | 11/2011 | Videtich ..................... 455/414.1 |

* cited by examiner

*Primary Examiner* — Khalid Shaheed
(74) *Attorney, Agent, or Firm* — Anthony Luke Simon; Reising Ethington P.C.

(57) ABSTRACT

A method and system for providing wireless mobile device information from a vehicle to a call center. The method includes the steps of (a) detecting the presence of a personal mobile device at the vehicle, (b) receiving at a vehicle interface module a mobile device identifier from the personal mobile device, and (c) sending the mobile device identifier from the vehicle interface module to a call center via the mobile device. The mobile device identifier received at the call center can be used for various purposes such as to provide a callback number in the event of a dropped call, or to validate that services are authorized for the vehicle.

17 Claims, 3 Drawing Sheets

PROVIDING WIRELESS MOBILE DEVICE INFORMATION TO A CALL CENTER

TECHNICAL FIELD

The present invention relates generally to vehicle communication systems and, more particularly, to techniques for enabling the provision of services from a call center to a vehicle via an occupant's personal mobile device.

BACKGROUND OF THE INVENTION

Many vehicles today come equipped with telematics units that can communicate via cellular or other wireless communication. This enables the delivery of various services to the vehicle operator. For vehicles not equipped with a dedicated telematics unit, the prevalence of personal wireless mobile devices such as cellular phones provides an opportunity to deliver some services to the vehicle or its occupants via the mobile device.

SUMMARY OF THE INVENTION

According to one embodiment, there is presented a method of providing wireless mobile device information from a vehicle for use by a call center in providing services at the vehicle. The method includes the steps of (a) detecting the presence of a personal mobile device at the vehicle, (b) receiving at a vehicle interface module a mobile device identifier from the personal mobile device, (c) sending at least the mobile device identifier from the vehicle interface module to a call center via the mobile device, and (d) validating that the mobile device identifier is authorized to receive call center services for the vehicle.

In another embodiment, there is presented a method of providing wireless mobile device information from a vehicle to a call center. The method includes the steps of (a) detecting the presence of a personal mobile device at the vehicle, (b) receiving at a vehicle interface module a mobile device identifier from the personal mobile device, and (c) sending the mobile device identifier and a unique vehicle identifier from the vehicle interface module to a call center via the mobile device. In some embodiments, that mobile device identifier and the vehicle identifier can be used to authorize services to the vehicle and/or occupant. In other embodiments, the mobile device identifier can be used to place a return call to the vehicle in the event an earlier call is dropped.

In yet another embodiment, there is presented another method of providing wireless mobile device information from a vehicle for use by a call center in providing services at the vehicle. The method of this embodiment includes the steps of (a) upon operation of the vehicle by an operator, detecting one or more wirelessly accessible mobile devices at the vehicle, (b) determining if more than one wirelessly accessible mobile device is present and, if so, selecting the mobile device having highest priority from a priority list and, if not, selecting the single wirelessly accessible mobile device, (c) pairing the selected mobile device with a vehicle interface module via a Bluetooth connection, (d) obtaining via the Bluetooth connection a phone number used to call the mobile device, (e) receiving at a call center a call from the mobile device, (f) sending the phone number from the vehicle interface module to the call center over the call via the mobile device, and (g) subsequently using the phone number to provide vehicle services from the call center via the mobile device.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The system and methods described below are directed to different embodiments for using a vehicle interface module to provide a call center with wireless mobile device information for occupant mobile devices that wirelessly connect to the interface module. This can be helpful, for example, when a services subscriber uses a personal mobile device in a vehicle without an embedded phone or if the call center needs to place calls to the subscriber. Other reasons will be recognized by skilled artisans. In general, the disclosed methods detect the presence of a personal mobile device at the vehicle, receive the detected mobile device identifier at a vehicle interface module, and send at least the mobile device identifier from the vehicle interface module to a call center via the mobile device.

Communications System—

Figure 1:
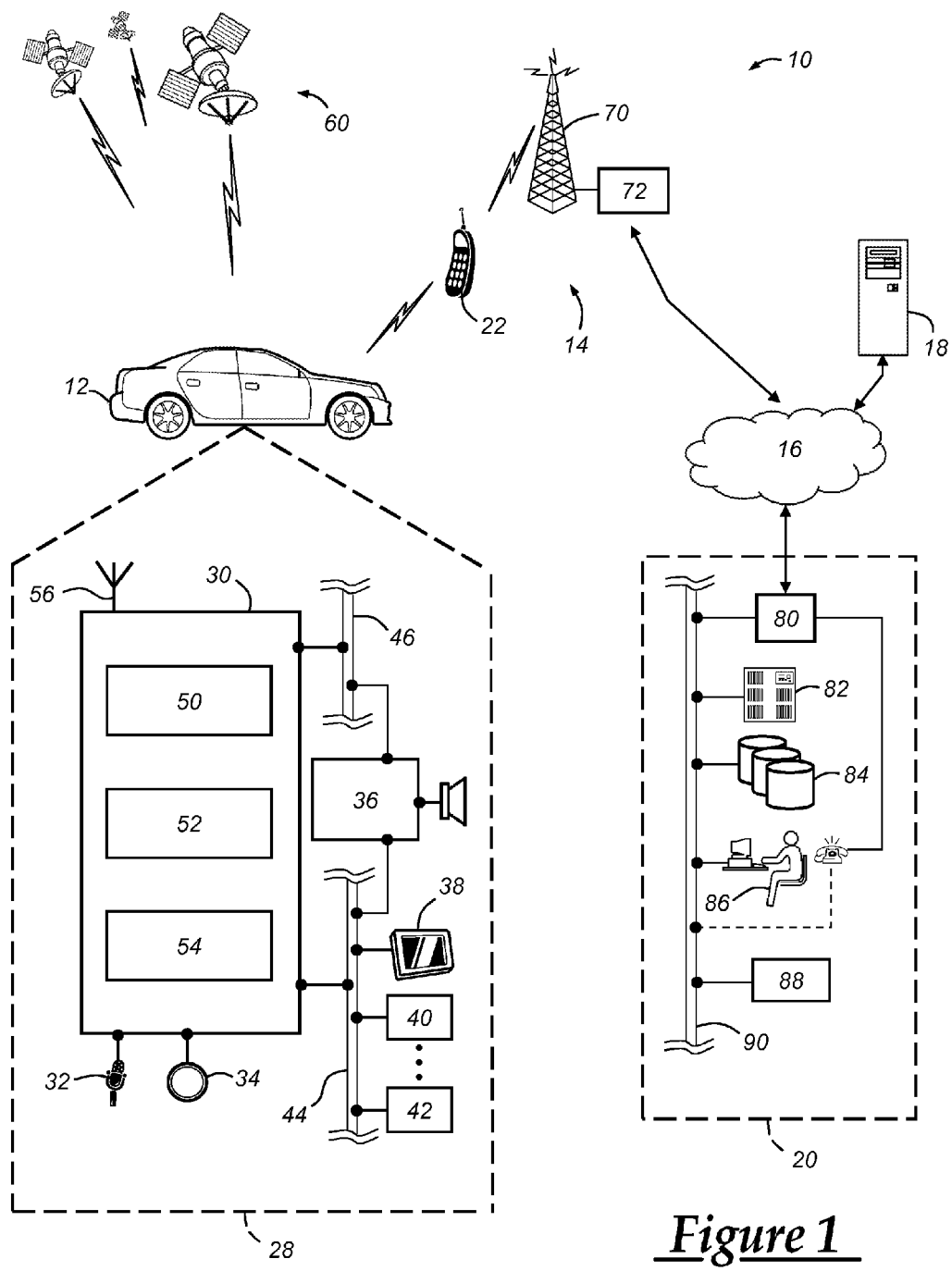
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, a call center 20, and a mobile device 22. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a vehicle interface module 30, a microphone 32, one or more pushbuttons or other control inputs 34, an audio system 36, a visual display 38, and a GPS module 40 as well as a number of vehicle system modules (VSMs) 42. Some of these devices can be connected directly to and/or be provided as a part of the interface module 30 such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. Audible output from the vehicle interface module 30 can be via the speaker(s) of the audio system 36 and/or via one or more speakers connected more directly to the interface module 30.

The microphone 32, pushbuttons(s) 34, audio system 36, and visual display 38 are each individually and collectively vehicle user interfaces that provide vehicle occupants with a means of providing and/or receiving information. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the interface module 30 to enable the driver or other occupant to provide voice commands and carry out hands-free calling via the mobile device 22 and the wireless carrier system 14. For this purpose, it can be connected to an on-board automated voice processing unit utilizing human-machine interface (HMI) technology known in the art. The pushbutton(s) 34 allow manual user input into the interface module 30 to initiate wireless telephone calls via the mobile device 22 and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Interface module 30 is an OEM-installed or aftermarket device that communicates wirelessly via Bluetooth or other short range communication with the vehicle operator's (or other occupant's) mobile device 22. Using this short range connection, interface module 30 can communicate with the call center 20 and/or other remote locations via the mobile device 22. For mobile devices having data connection capability, such as a packetized data connection using the carrier system 14 (e.g., using GPRS or EDGE), data communications can be carried out between the vehicle interface module 30 and the call center 20 using suitable programming of the mobile device to permit pass through communications of data between the call center 20 and interface module 30. Alternatively, data communication can be carried out over a voice channel established between the mobile device and call center using an in-band modem within the interface module 30 that encodes the data onto a carrier that is sent to the call center via the short range connection to the mobile device 22 and then via the cellular voice channel established between the mobile device and call center.

Apart from data transmission between the call center 20 and interface module 30 via the mobile device 22, voice communications can be carried out between an advisor at the call center and an occupant of the vehicle using the interface module 30 and the microphone 32 and speaker(s). By providing both voice and data communication, interface module 30 enables the vehicle to offer a number of different services including those related to navigation, telephony, emergency assistance, diagnostics, infotainment, etc. As noted above, data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done from the interface module 30 or mobile device 22 using techniques known to those skilled in the art.

According to one embodiment, interface module 30 communicates wirelessly with the mobile device 22 via a transceiver circuit 50 (and associated antenna 56 if needed). The interface module 30 also includes an electronic processing device 52 and one or more digital memory devices 54. The processing device 52 controls operation of the interface module using a program stored in memory 54. It may provide a variety of functions, including speech recognition, speech synthesis, call initiation and reception, vehicle data acquisition over the bus 44. Where a modem is used for data communication over a voice channel, processor 52 can use suitable programming to carry out the modem functions. Alternatively, the modem could be incorporated into the circuit 50. For the short range communication with the mobile device 22, wireless networking may be carried out according to one or more wireless protocols, such as any of the IEEE 802.11 protocols, WiMAX, or Bluetooth. When used for packet-switched data communication such as TCP/IP, the interface module and/or mobile device 22 can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for interface module 30 or can be shared with other vehicle systems. Processor 52 executes various types of digitally-stored instructions, such as software or firmware programs stored in memory 54, which enable the interface module to provide a wide variety of functions. For instance, processor 52 can execute programs or process data to carry out at least a part of the method discussed herein.

Interface module 30 may be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of interface module 30, but are simply an enumeration of some of the services that the interface module is capable of offering. Furthermore, it should be understood that at least some of the aforementioned modules could be implemented in the form of software instructions saved internal or external to interface module 30, they could be hardware components located internal or external to interface module 30, or they could be integrated and/or shared with each other or with other systems located throughout the vehicle, to cite but a few possibilities. In the event that the modules are implemented as VSMs 42 located external to interface module 30, they could utilize vehicle bus 44 to exchange data and commands with the interface module.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via interface module 30, wherein the position information is sent via the mobile device 22 to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the mobile device 22 and the interface module 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the interface module 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via interface module 30 and wireless carrier 14. Other such accessible computers 18 can be, for example: a service center computer where diagnostic information and other vehicle data can be uploaded from the vehicle via the interface module 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Apart from computer 18, other types of remotely located processing devices can be used. For example, a mobile device 22 can be used and can be one of a number of such communication devices used by subscribers. Each mobile device 22 is a processing device that can be used for one or more purposes, such as voice communication, text messaging, email, web browsing, gaming, camera, video recording, sending and receiving photos and videos, audio player (e.g., MP3), radio, GPS navigation, personal organizer, to name but a few. In the illustrated embodiment, mobile device 22 is a mobile phone also known as a cell or cellular phone that connects to a cellular network such as system 14. Mobile device 22 can employ one of a variety of wireless technology including Bluetooth (e.g. hands-free headset, games, watches, sports sensors, medical devices, etc.), etc. Various other types of suitable processing devices will be apparent to those skilled in the art.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
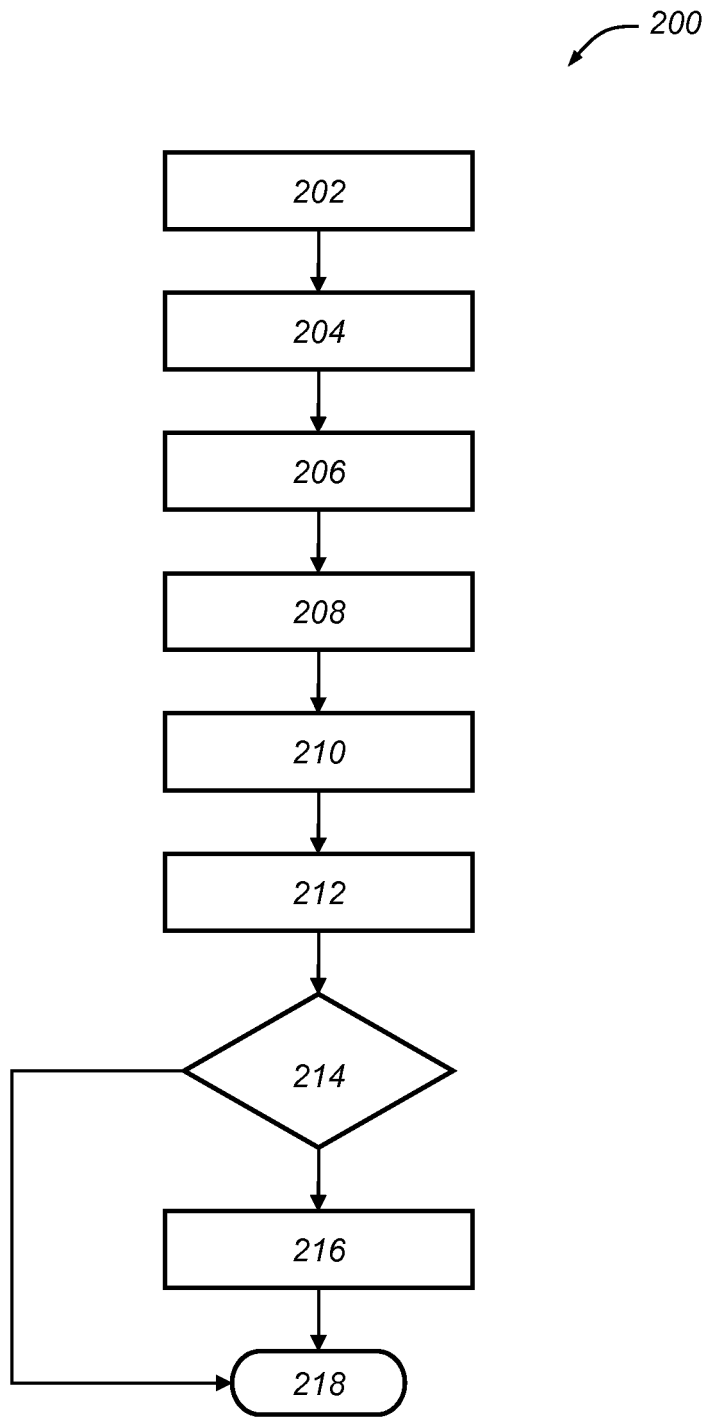
FIG. 2 is a flowchart of an exemplary method that may be used to provide wireless mobile device information from a vehicle to a call center for use in providing services to the vehicle or occupant(s)

Turning now to FIG. 2, there is shown a method 200 for providing wireless mobile device information from a vehicle for use by a call center in providing services at the vehicle. The method starts at step 202 and begins by detecting one or more mobile devices at the vehicle. In one embodiment, upon vehicle 12 operation by an operator, interface module 30 detects one or more mobile devices 22. The vehicle operation may include turning vehicle 12 ignition on, switching gears, opening or closing one or more doors, driving a few miles, etc. Interface module 30 may detects one or more mobile devices in various ways; for example, by determining whether there are any nearby mobile devices wirelessly accessible via Bluetooth or other short range communication. This may be done by sending an interrogation signal and then receiving one or more responses from any wirelessly accessible devices 22. Other approaches for detecting mobile devices can be used.

In some instances there will be only a single mobile device present in which case that single device is selected for use. In other cases, there may be multiple mobile devices present in which case a selection is made among the available devices. Where a selection between multiple devices is needed, then at step 204, method 200 selects the mobile device with the highest priority to be used from a priority list. In one embodiment, a priority list that contains one or more mobile device identifiers listed according to vehicle 12 operator preference is stored in interface module memory 54. In another embodiment, vehicle 12 operator instructs interface module 30 about which mobile device 22 to use via microphone 32, pushbutton 34, audio system 36, display 38, and/or any other vehicle system module 42. In this embodiment, the operator may instruct interface module 30 to use a specific mobile device 22 without being requested by interface module 30. In this case, step 202 can become optional and method 200 starts at step 204 or step 206. However, in another embodiment, interface module 30 can prompt the operator that one or more mobile devices are detected and requests that the operator provide it with the desired mobile device 22 to be used. In yet another embodiment, interface module 30 selects the first detected mobile device 22 and method 200 proceeds to the next step.

At step 206, method 200 links mobile device 22 with vehicle interface 30. In one embodiment, mobile device 22 is paired to vehicle interface 30 via a Bluetooth connection. Other embodiments are possible, for instance, mobile device 22 can be linked to interface module 30 via any other wireless methods including WiFi, WiMax, 3G, and/or any other method. Although the illustrated embodiment uses a wireless technique, skilled artisans should appreciate that wired techniques can be used as well.

At step 208, method 200 obtains a mobile device identifier for the mobile device 22. Preferably, this identifier is one that can be used by the call center to contact the mobile device via the wireless carrier system 14. For example, this mobile device identifier can be a phone number of the mobile device 22 that is obtained by the interface module 30 via a Bluetooth connection. In one embodiment, the phone number is a mobile directory number (MDN). Skilled artisans should appreciate that the phone number can take the form of any other appropriate number including mobile identification number (MIN), temporary mobile subscriber identity (TMSI), a combination of numbers, and/or other suitable number.

Next, at step 210, a call is placed between mobile device 22 and call center 20. In one embodiment, interface module 30 performs an ATD modem command to mobile device 22 to place a data call to call center 20. Other techniques of sending data or performing a data call include dual tone multi frequency signaling (DTMF) (e.g., in-band, RFC2833, SIP INFO, IAX2, etc.), short message service (SMS), circuit switched data (CSD), and/or other techniques. The call can be one initiated by the vehicle operator, either directly from the mobile device 22 or via the interface module 30. This may be done, for example, in response to an instruction provided to the vehicle operator from the interface module 30.

Once the call is established, then at step 212, the phone number (or other mobile device identifier) is sent to call center 20 over the established call. As noted above, this may be handled as a data call (either via a data channel or a via a voice channel using a modem). Alternatively, it could be carried out using dual-tone multi-frequency (DTMF) tones or other audio signaling to transmit the phone number from the interface module 30 to the call center 20 via the mobile device 22. Furthermore, additional data can be sent to call center 20 to provide more information about mobile device 22 (e.g., electronic serial number (ESN), international mobile equipment identity (IMEI), etc.) or to associate the mobile device with the vehicle (e.g., by way of a unique vehicle identifier such as a VIN, interface module ID, subscriber account number, etc.). By providing a vehicle identifier to the call center from the interface module, the call center can associate the received telephone number (or other mobile device identifier) with the vehicle and/or services subscription. And while call center 20 can utilize a phone number retriever technique (e.g., Caller ID), those skilled in the art will appreciate the disadvantages of doing so—some communication networks may not support this feature, the services subscriber may disable this feature, and/or other reasons that may render the retrieving technique unreliable. Hence, method 200 provides more reliable techniques to provide call center 20 with the phone number.

At step 214, method 200 determines if the phone number is stored at the call center in association with the vehicle. In one embodiment, call center 20 stores phone numbers in database 84 where it searches for the received phone number. Call center 20 may search database 84 by pointing to the vehicle subscriber account and checking if the phone number is found. Or, this can be done by searching for the phone number itself, or based on the vehicle identifier. If the phone number is not found then it may be added and used subsequently to authorize services for the vehicle and/or its occupant(s) via the associated mobile device 22. This can involve first checking to determine if the vehicle owner or user has authorized and/or paid for a service subscription and then storing the number only if such authorization or payment has been made. The method 200 then ends at step 218. However, if the phone number is found then method 200 proceeds to step 216.

At step 216, method 200 validates the phone number as authorized to be used. In one embodiment, call center 20 determines that the phone number is registered by the subscriber and can be used to provide services to the subscriber. In addition, method 200 may identify it as the current phone number to use in placing calls from call center 20 to vehicle 12. In one embodiment, call center 20 uses the identified phone number to place a call to vehicle 12 after a phone call communication is lost or dropped. In this way, the method automatically provides the call center with a callback number that can be used for dropped calls, without any deliberate steps being taken by the vehicle occupant to do so. Call center 20 can store via its database 82 a list of callback phone numbers provided by the vehicle services subscriber; however, when identifying and using the current phone number, a faster, reliable and more timely service can be provided to the services subscriber. In this case, the subscriber does not have to wait for call center 20 to dial more than one phone numbers to reach the subscriber, especially, in an emergency assistance situation.

Figure 3:
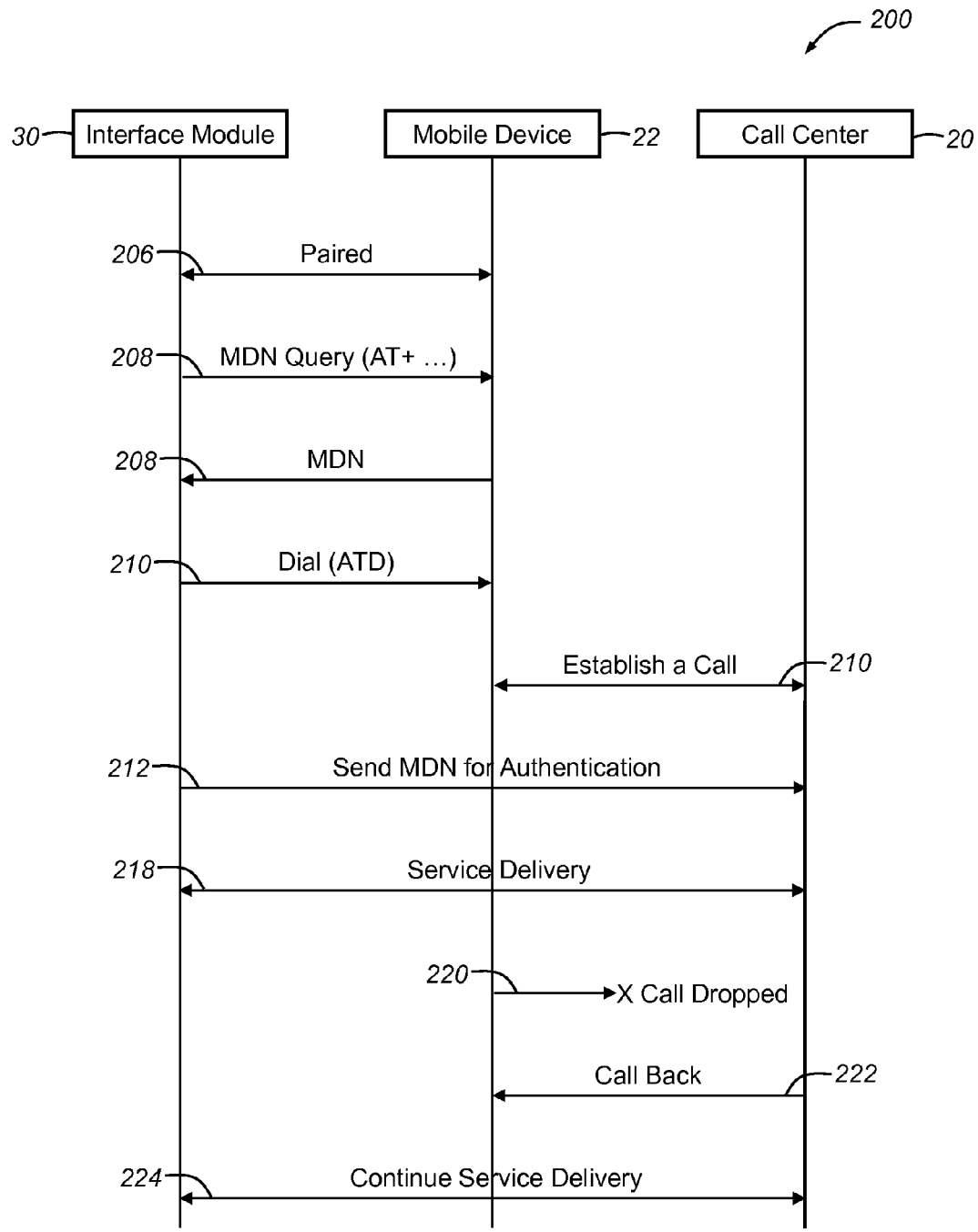
FIG. 3 is a diagram showing communication flow that can be used in connection with the method of FIG. 2.

Turning now to FIG. 3, there is shown a specific embodiment of method 200 where the corresponding steps of method 200 are labeled accordingly. It starts at step 206 where interface module is paired with mobile device 22. Then, at step 208, interface module 30 requests the MDN for mobile device 22 via an AT command. Later, at step 208, mobile device 22 provides interface module 30 with the MDN number. At step 210, interface module 30 sends a request to mobile device 22 via and ATD command. In response, mobile device 22 establishes a call with call center 20 (step 210). At step 212, the MDN is sent from interface module 30 to call center 20 via the established call. At step 218, a service is delivered between call center 20 and interface module 30 via mobile device 22. Again, this service can be any one or more of a number of different services, such as providing data for a navigation route or to run diagnostics in the vehicle, or providing voice communication between an advisor at the call center and an occupant via the interface module for such purposes as emergency assistance, concierge services, subscriber account assistance, etc. If the call is dropped (step 220) (e.g., while a service subscriber is requesting or receiving services) then a call is performed from call center 20 to mobile device 22 (step 222). Then, at step 224, method 200 continues the service delivery between call center 20 and interface module 30 via mobile device 22.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing wireless mobile device information from a vehicle for use by a call center in providing services at the vehicle, comprising the steps of:
   (a) receiving at a vehicle interface module an indication of a vehicle operation by an operator;
   (b) based on the indication, determining at the vehicle interface module that at least one mobile device is available for Bluetooth pairing via the vehicle interface module using a Bluetooth transmission, wherein when a plurality of mobile devices is determined to be available, then selecting one of the plurality of mobile devices having the highest priority from a list of mobile devices; thereafter
   (c) pairing the mobile device with the vehicle interface module via Bluetooth communication;
   (d) obtaining at the vehicle interface module via Bluetooth communication a mobile identifier associated with the mobile device;
   (e) establishing a first call between a call center and the mobile device;
   (f) sending the mobile identifier from the vehicle interface module to the call center over the first call via the mobile device;
   (g) experiencing a disconnection event of the first call; and
   (h) using the mobile identifier and the mobile device to provide services at the vehicle from the call center over a second, subsequent call.

2. The method of claim 1, wherein the mobile device is a mobile phone.

3. The method of claim 2, wherein the mobile identifier includes a telephone number for the mobile phone.

4. The method of claim 3, further comprising the steps of:
   placing the second, subsequent call from the call center to the mobile device using the telephone number; and
   communicating with an occupant of the vehicle over the second, subsequent call via the vehicle interface module and the mobile device.

5. The method of claim 1, wherein step (e) comprises receiving the mobile device identifier via a data session.

6. The method of claim 5, wherein the data session is a packetized data connection established between the vehicle interface module and the call center via the mobile device.

7. The method of claim 5, wherein the data session comprises a data connection established over a voice channel of a wireless communication network.

8. The method of claim 7, wherein the data session includes use of an in-band modem within the vehicle interface module.

9. The method of claim 1, wherein step (e) comprises receiving the mobile device identifier using dual-tone multi-frequency (DTMF) tones.

10. The method of claim 1, wherein step (f) further comprises:
   determining that the mobile identifier is already stored at the call center in association with the vehicle; then
   validating the mobile identifier at the call center; and
   identifying the mobile identifier as a current mobile identifier for placing future calls from the call center to the vehicle.

11. The method of claim 10, further comprising the step of:
replacing a previously stored mobile identifier with the current mobile identifier,
wherein the previously stored mobile identifier is different than the current mobile identifier.

12. The method of claim 1, wherein step (e) further comprises receiving at the call center a vehicle identifier that uniquely identifies the vehicle along with the mobile device identifier.

13. The method of claim 12, wherein step (f) further comprises validating at the call center the mobile device identifier based on the vehicle identifier.

14. The method of claim 1 further comprising selecting the mobile device having the highest priority from a priority list when a plurality of mobile devices is determined to be available in step (b).

15. The method of claim 14, wherein the priority list is stored at the vehicle interface module.

16. The method of claim 1, further comprising commanding the mobile device at the vehicle interface module to place the first call prior to step (e).

17. A method of providing wireless mobile device information from a vehicle for use by a call center in providing services at the vehicle, comprising the steps of:

(a) receiving at a vehicle interface module an indication of a vehicle operation by an operator;
(b) based on the indication, determining at the vehicle interface module that at least one mobile device is available for Bluetooth pairing via the vehicle interface module using a Bluetooth transmission, wherein when a plurality of mobile devices is determined to be available, then selecting the mobile device having the highest priority from a priority list of mobile devices, wherein the priority list is stored at the vehicle interface module; thereafter
(c) pairing the mobile device with the vehicle interface module via Bluetooth communication;
(d) obtaining at the vehicle interface module via Bluetooth communication a mobile identifier associated with the mobile device;
(e) receiving at a call center a call from the mobile device;
(f) sending the mobile identifier from the vehicle interface module to the call center over the call via the mobile device; and
(g) subsequently using the mobile identifier and the mobile device to provide services at the vehicle from the call center.

* * * * *